United States Patent [19]

Slavenburg et al.

[11] Patent Number: 5,832,202
[45] Date of Patent: Nov. 3, 1998

[54] EXCEPTION RECOVERY IN A DATA PROCESSING SYSTEM

[75] Inventors: Gerrit Ary Slavenburg, Los Altos; Junien Labrousse, Palo Alto, both of Calif.

[73] Assignee: U.S. Philips Corporation, New York, N.Y.

[21] Appl. No.: 358,127

[22] Filed: Dec. 16, 1994

Related U.S. Application Data

[63] Continuation-in-part of Ser. No. 998,080, Dec. 29, 1992, which is a continuation-in-part of Ser. No. 578,976, Sep. 5, 1990, abandoned, Ser. No. 594,534, Oct. 5, 1990, abandoned, and Ser. No. 654,847, Feb. 11, 1992, Pat. No. 5,313,551, each is a continuation-in-part of Ser. No.290,979, Dec. 28, 1988, abandoned.

[51] Int. Cl.$^6$ .................................................... G06F 11/14
[52] U.S. Cl. ...................................... 395/182.14; 395/733
[58] Field of Search ......................... 395/182.14, 182.13, 395/182.15, 375, 181, 460, 445, 444, 427

[56] References Cited

U.S. PATENT DOCUMENTS

| | | | |
|---|---|---|---|
| 3,736,566 | 5/1973 | Anderson et al. | 340/172.5 |
| 4,703,481 | 10/1987 | Fremont | 395/182.15 |
| 4,740,969 | 4/1988 | Fremont | 395/182.13 |
| 4,875,160 | 10/1989 | Brown, III | 395/182.13 X |
| 4,941,087 | 7/1990 | Kap | 395/733 |
| 5,003,458 | 3/1991 | Yamaguchi et al. | 395/375 |
| 5,313,551 | 5/1994 | Labrousse et al. | 395/425 |
| 5,450,556 | 9/1995 | Slavenburg et al. | 395/375 |

FOREIGN PATENT DOCUMENTS

| | | | |
|---|---|---|---|
| 0212132A1 | 6/1985 | European Pat. Off. | G06F 11/14 |
| 0163096A1 | 12/1985 | European Pat. Off. | G06F 11/14 |
| 0348652 | 1/1990 | European Pat. Off. | |

OTHER PUBLICATIONS

Alexander et al., "Contributions: Translation Buffer Performance in a UNIX Environment", Computer Architecture News, vol. 13, No. 5, Dec. 1985, pp. 1–14.
"Checkpoint Repair for High–Performance Out–of–Order Execution Machines", by W. Wen–Mei et al, IEEE 1987, pp. 1496–1514.
"A VLIW Architecture for a Trace Scheduling Compiler", by R.P. Colwell et al, pp. 180–192.
"MC68020 32–Bit Microprocessor User's Manual", Motorola.
"Intel Microprocessors, vol. I".
"The SPARC Architecture Manual", Version 8.

*Primary Examiner*—Ly V. Hua
*Attorney, Agent, or Firm*—Anne E. Barschall; Debra K. Stephens

[57] ABSTRACT

A processing device performs operations in response to program instructions. In particular, values are written to a data memory of the system, which alters a defined visible state of the system. In the event of an exception (e.g. a pagefault or TLB miss in a virtual memory system), control returns to a recent checkpoint instruction after handling the exception, and instructions are re-executed. A record/replay circuit is provided in the form of an event memory, which remembers only those values read from the data memory since the last checkpoint. During the re-execution, the recorded values are reproduced instead of performing actual memory reads, and all memory accesses are suppressed. When the re-execution reaches the point where execution was originally interrupted, recording begins again to prepare for any further exception which may arise before the next checkpoint.

23 Claims, 7 Drawing Sheets

I.

|  |  |  |  |  | DEC.-- . -. SE | | | | | | | | | |
|---|---|---|---|---|---|---|---|---|---|---|---|---|---|---|
| Cy | COC | ALC | RGC | DMC | BRC | AL.G | AL.L | AL.R | RG.G | RG.I | DM.G | DM.A | DM.I | BR.G | BR.A |
| 0 | Op005 | — | Op001 | — | — | — | — | CO | — | — | — | — | — | — | — |
| 1 | Nw015 | Op006 | — | — | — | — | RG | — | — | — | — | — | — | — | CO |
| 2 | Op002 | Op003 | — | Op007 | Nw016 | — | — | CO | — | — | — | AL | — | — | — |
| 3 | Op010 | — | — | Op004 | — | — | — | CO | — | — | — | AL | — | — | — |
| 4 | — | Op012 | — | Op008 | — | — | DM | — | — | — | — | DM | — | — | — |
| 5 | — | Op011 | — | Op013 | — | — | DM | — | — | — | — | XX | — | — | — |
| 6 | — | — | — | Op009 | — | — | — | — | — | — | — | AL | DM | — | — |
| 7 | — | — | — | Op014 | — | — | — | — | — | — | — | — | DM | — | — |

II.

| Cy | COC | ALC | RGC | DMC | BRC | AL.G | AL.L | AL.R | RG.G | RG.I | DM.G | DM.A | DM.I | BR.G | BR.A |
|---|---|---|---|---|---|---|---|---|---|---|---|---|---|---|---|
| 0 | Op005 | — | Op001 | — | — | — | — | CO | — | — | — | — | — | — | — |
| 1 | Nw015 | Op006 | — | — | — | — | RG | — | — | — | — | — | — | — | CO |
| 2 | Op002 | Op003 | — | Op007 | — | — | — | CO | — | — | — | AL | — | — | — |
| 3 | Op010 | — | — | — | Nw016 | — | — | CO | — | — | — | AL | — | — | — |
| 4 | — | Op012 | — | Op004 | — | — | DM | — | — | — | — | DM | — | — | — |
| 5 | — | — | — | Op008 | — | — | — | — | — | — | — | AL | — | — | — |
| 6 | — | Op011 | — | Op013 | — | — | DM | — | — | — | — | DM | — | — | — |
| 7 | — | — | — | Op009 | — | — | — | — | — | — | — | AL | DM | — | — |
| 8 | — | — | — | Op014 | — | — | — | — | — | — | — | — | DM | — | — |

III.

| Cy | COC | ALC | RGC | DMC | BRC | AL.G | AL.L | AL.R | RG.G | RG.I | DM.G | DM.A | DM.I | BR.G | BR.A | SP |
|---|---|---|---|---|---|---|---|---|---|---|---|---|---|---|---|---|
| 0 | Op005 | — | Op001 | — | — | — | — | CO | — | — | — | — | — | — | — | — |
| 1 | Nw015 | Op006 | — | — | — | — | RG | — | — | — | — | — | — | — | CO | — |
| 2 | Op002 | Op003 | — | Op007 | Nw016 | — | — | CO | — | — | — | AL | — | — | — | — |
| 3 | Op010 | — | — | Op004 | — | — | — | CO | — | — | — | AL | — | — | — | — |
| 4 | — | Op012 | — | Op008 | — | — | DM | — | — | — | — | DM | — | — | — | — |
| 5 | — | — | — | Op013 | — | — | DM | — | — | — | — | AL | — | — | — | DM |
| 6 | — | Op011 | — | Op009 | — | — | — | — | — | — | — | SP | DM | — | — | — |
| 7 | — | — | — | Op014 | — | — | — | — | — | — | — | AL | DM | — | — | — |

FIG. 5

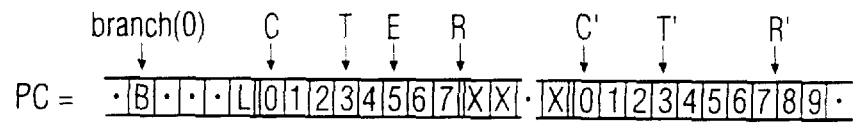
FIG. 8
FIG. 9a
FIG. 9b  CPT
FIG. 9c  TREC
FIG. 9d  EVT
FIG. 9e  EXDET
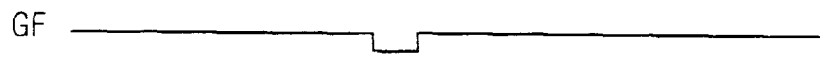
FIG. 9f  GF
FIG. 9g  EXH
FIG. 9h  REP

EXCEPTION RECOVERY IN A DATA PROCESSING SYSTEM

CROSS-REFERENCES TO RELATED APPLICATIONS

The present application is a continuation-in-part of U.S. application Ser. No. 998,080 filed Dec. 29, 1992 (PHA 21,777) which in turn was a continuation-in-part of U.S. application Ser. No. 578,976 (PHA 1205) filed Sept. 5, 1990, which was abandoned and refiled as U.S. application Ser. No. 142,648 on Oct. 25, 1993;

U.S. application Ser. No. 594,534 (PHA 1209) filed on Oct. 5, 1990, which was abandoned and refiled as U.S. application Ser. No. 063,850 on May 15, 1993; and U.S. application Ser. No. 654,847 (PHA 1211) filed Feb. 11, 1992, which has since issued as U.S. Pat. No. 5,313,551;

all of which were continuations-in-part of U.S. application Ser. No. 290,979 (PHN 12,376) filed Dec. 28, 1988, which was abandoned and refiled as U.S. application Ser. No. 593,336 on Oct. 1, 1990, which has since issued as U.S. Pat. No. 5,103,311.

All of the parent applications are incorporated herein by reference.

FIELD OF THE INVENTION

This invention relates to methods and apparatus for exception recovery in data processing systems. The invention relates in particular to a method of operating a data processing system controlled by a sequence of instructions forming a program, the method comprising the steps of:

(a) defining a number of checkpoints in the program and executing the program, said execution involving data transfers within the system, including a first type of data transfer which is dependent on a defined machine state;

(b) interrupting execution of the program in response to the detection of an exception arising in the execution in step (a); and (c) re-executing the program from the most recent checkpoint after resolution of the exception.

DESCRIPTION OF RELATED ART

Data processing systems require to cope in a consistent manner with a variety of 'exceptions' that arise in the course of executing a program. Exceptions include for example interrupts, arithmetic overflows and pagefaults. Interrupts (caused by external, asynchronous events) can be handled by delaying their handling until the system reaches a well-defined state, which can be saved and retrieved after the interrupt is handled. This is done for example in the 68000 microprocessor family, where interrupts are handled only at macroinstruction boundaries. Arithmetic overflows, on the other hand, may be regarded as fatal to the part of the program being executed, so that the machine state becomes irrelevant.

A further category of exceptions arise in the course of normal program execution, where control is given to the software from the hardware. A prime example, requiring efficient handling, is the 'pagefault' in a virtual memory system, where only certain parts of the addressable memory are immediately accessible at a given time. Other examples include traps to emulate unimplemented op-codes, TLB miss traps in systems where the Memory Management Unit (MMU) has no table-walk hardware, and the handling of special cases in IEEE floating point arithmetic. This type of exception must be handled immediately, whatever the state of the machine, and recovered from quickly and reliably, or the utility of a large memory with virtual addressing is lost. In the MC68020, for example, the relevant state of the processor is saved on the stack and retrieved after the exception is handled. Since the machine is deterministic in its operation, restoring it to a state known to be valid ensures that it will resume operation for all practical purposes exactly as if the exception had never occurred.

Higher performance processors tend to be heavily pipelined. The state of such a machine is very large, and much of it resides in pipeline stages which are expensive to access, because of the additional hardware data paths required. It has therefore become the practice to define occasional 'checkpoints' in the program. When a checkpoint is reached in the course of execution, a backup copy is made of the machine state, so far as it is relevant to future operations. After handling an exception, the processor state is restored to what it was at the most recent checkpoint, and execution is resumed from that checkpoint.

Exception recovery using checkpoints is described in detail in the paper "Checkpoint Repair for High-Performance Out-of-Order Execution Machines", by W.-M. W. Hwu and Y. N. Patt, IEEE Transactions on Computers, Vol.C-36, No.12 (December 1987). Hwu and Patt describe methods and apparatus for keeping backup copies of small register files, for restoring the machine to a checkpoint state. Backup copies are not practicable for very large amounts of machine state, which in many cases includes the entire contents of the main memory. Accordingly, Hwu and Patt describe a method wherein values overwritten by data transfers to the memory occurring since the most recent checkpoint are saved, and rewritten to restore the state before restarting execution from the checkpoint. The saved values occupy very little space, but the rewriting of these values can be time-consuming, reducing the overall performance of the processing system.

A checkpoint retry system is also described in European patent application EP-A2-0 348 652. In that system, values written to a cache memory are held in special buffer until the checkpointed instructions are finished, thereby delaying state changes until it is known that no exception has arisen.

A type of processing device which depends strongly on parallel execution and deep pipelining is the 'very long instruction word' (VLIW) type of processor. 'The Ideal VLIW' processor and a practical VLIW processor known as the TRACE processor are described by R. P. Colwell et al in an article entitled 'A VLIW Architecture for a Trace Scheduling Compiler', published in the Proceedings of the Second International Conference on Architectural Support for Programming Languages and Operating Systems (ASPLOS II) at Palo Alto, Calif., Oct. 5–8, 1987, pages 180 to 192. With regard to exception recovery, Colwell et al describe vaguely a '"history queue" mechanism' which reissues interrupted memory operations once the exception has been resolved.

A video signal processor having a VLIW architecture is described in the copending parent application 290,979 referred to above. In the limited application of video signal processing, small cyclic programs are used, with physical memory, so that the problem of recoverable exceptions should not arise. A similar structure for more general processing devices was described by the present inventors in 'CREATE-LIFE: A Design System for High Performance VLSI Circuits', Proc. IEEE International Conference on Computer Design, Oct. 3–5, 1988, and in the copending parent application 594,534. As it became desirable to use this structure in general processing applications, requiring large virtual memory, the problem of exception recovery has arisen. The penalties of using the known recovery systems, in terms of circuit size and/or lost performance, were found to be particularly severe in a VLIW processor.

Other references describing VLIW processors, mentioned in the copending parent application 594,534, do not refer to the methods of exception recovery (if any) adopted therein.

Another problem associated with known exception recovery systems is that they do not readily allow the 'elimination of control pipelining', a measure which could otherwise reduce the circuit size for a given performance level, particularly in VLIW processors.

SUMMARY OF THE INVENTION

It is an object of the invention to provide an alternative exception recovery method having a reduced performance penalty and/or a small circuit size. It is a particular object of the invention to provide an exception recovery method suitable for use in heavily pipelined processing systems such as VLIW processors.

The invention provides a method of operating a data processing system controlled by a sequence of instructions forming a program, the method comprising the steps (a), (b) and (c) referred to above, wherein step (a) includes recording each data transfer of the first type since the most recent checkpoint, and step (c) includes reproducing the recorded data transfers in place of actual data transfers, synchronously with the re-execution.

Instead of restoring the machine state before re-execution to what it was at the checkpoint, the method in accordance with the invention ignores the present machine state and substitutes the recorded values which were derived from the correct machine state before the exception arose. The small circuit size of the Hwu and Patt method has been maintained, while the performance penalty involved in restoring the correct machine state has been eliminated. It may be noted that the known methods restore all values overwritten since the checkpoint, regardless of whether they would have any effect on the re-execution. In contrast, the method according to the invention stores and reproduces only those values which were actually used in the original execution, and so will be required for the re-execution.

When programming such a processing device, a very limited 'programmer-visible' state is defined, excluding the contents of pipeline stages. Checkpoints are then defined at points in the program at which only this visible state is relevant to future operation. This can be arranged by dividing the program into checkpointed fragments such that each fragment has only one possible predecessor in the sequence of operation. In other words the flow of control is preferably divergent at a checkpoint. On the rare occasions when a convergent branch is unavoidable, the program can be scheduled such that only the visible state is relevant at the convergence point (the pipeline is empty), or other measures taken to ensure a correct state.

Step (c) may include resuming normal execution of the program while recording data transfers of the first type in accordance with step (a) when the re-execution reaches the point where the execution was interrupted in step (b). The method can then cope automatically with any further exceptions following the same checkpoint.

The steps required to resolve the exception will depend on the nature of the exception in a manner well-known to those skilled in the art, involving special hardware and/or software elements if necessary. These steps form no part of the present invention.

That said, in an embodiment where the interruption of execution in step (b) results in a transfer of control of the system from the program to an exception handling routine, the transfer of control may be delayed so that operations started before the exception arises are allowed to complete their execution. At the same time, operations started in the delay before the transfer of control to the exception handling routine may be inhibited so that they have no effect on the defined machine state. These measures can be used as necessary to ensure that the machine state is correct when normal execution resumes from the point of interruption.

In particular, the guarding' facility of the LIFE type of VLIW processor can be used to inhibit operations without special hardware. It has further been found that the use of this facility (or an equivalent) allows the elimination of control pipelining, without the problems that this would cause in conventional exception recovery systems.

The invention further provides data processing systems and devices suitable for operation according to methods embodying the invention as described above.

BRIEF DESCRIPTION OF THE DRAWINGS

Embodiments of the invention will now be described, by way of example, with reference to the accompanying drawings, in which:

FIG. 5 illustrates the scheduling of the first example program fragment for the device of FIG. 1, including the problem of collisions;

FIG. 8 illustrates the scheduling of a second example program fragment;

FIG. 9 illustrates the operation of the exception recovery circuitry in the execution of the second example program fragment.

OVERVIEW OF A PROCESSING DEVICE

Figure 1:
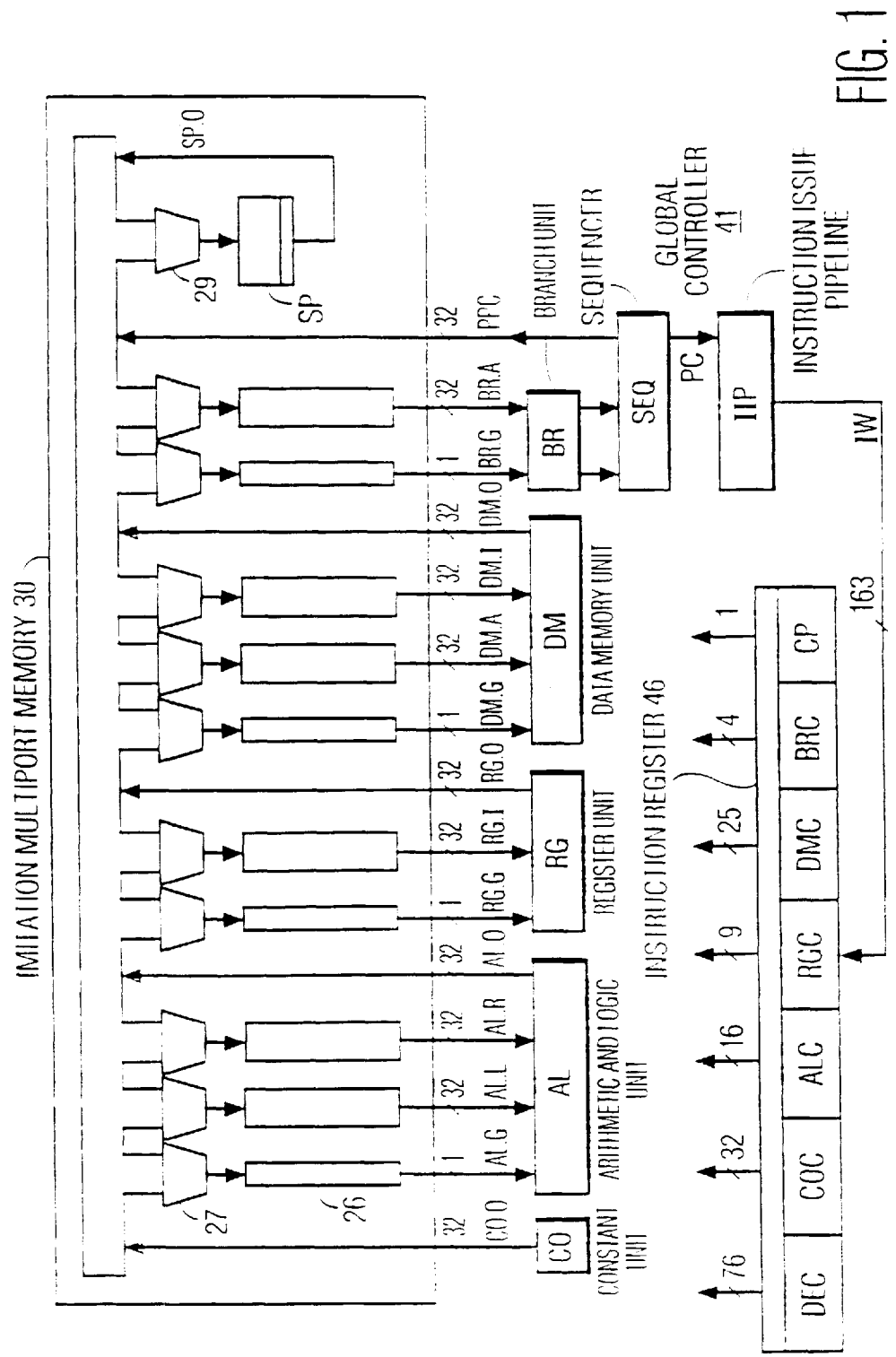
FIG. 1 shows in block schematic form a processing device in accordance with the present invention.

The processing device of FIG. 1 comprises an imitation multiport memory circuit 30 which is connected to five functional units including a Constant Unit CO, an Arithmetic and Logic Unit AL, a Register Unit RG, a Data Memory Unit DM and a Branch Unit BR. Within memory circuit 30 there are shown in schematic form memory units 26, multiplexers 27 and a Special Register SP with an associated multiplexer 29. The principles of operation of such a memory circuit and processor are described in the copending parent application 594,534, and in the reference by Slavenburg and Labrousse, both mentioned above. These principles form no part of the present invention and their description has been omitted in the present application, for the sake of brevity.

A Global Controller 41 is provided which comprises a Sequencer SEQ and an Instruction Issue Pipeline IIP. The Sequencer SEQ generates in each cycle a program counter word PC which is supplied to Instruction Issue Pipeline IIP. The Instruction Issue Pipeline IIP may be off-chip, and includes the program memory wherein the very long instruction words forming the program for execution are encoded. After a certain number of cycles delay, Instruction Issue Pipeline IIP feeds an on-chip Instruction Register 46 with a very long instruction word IW stored in the program memory at the address PC.

The instruction word IW in register 46 comprises a Destination Control field DEC and a number of fields COC, ALC, RGC, DMC and BRC for controlling the individual functional units CO, AL, RG, DM and BR respectively, and a further bit CP for checkpoint marking. The total number of bits in instruction word IW is 163, although the processor described is a very simple example.

Figure 2:
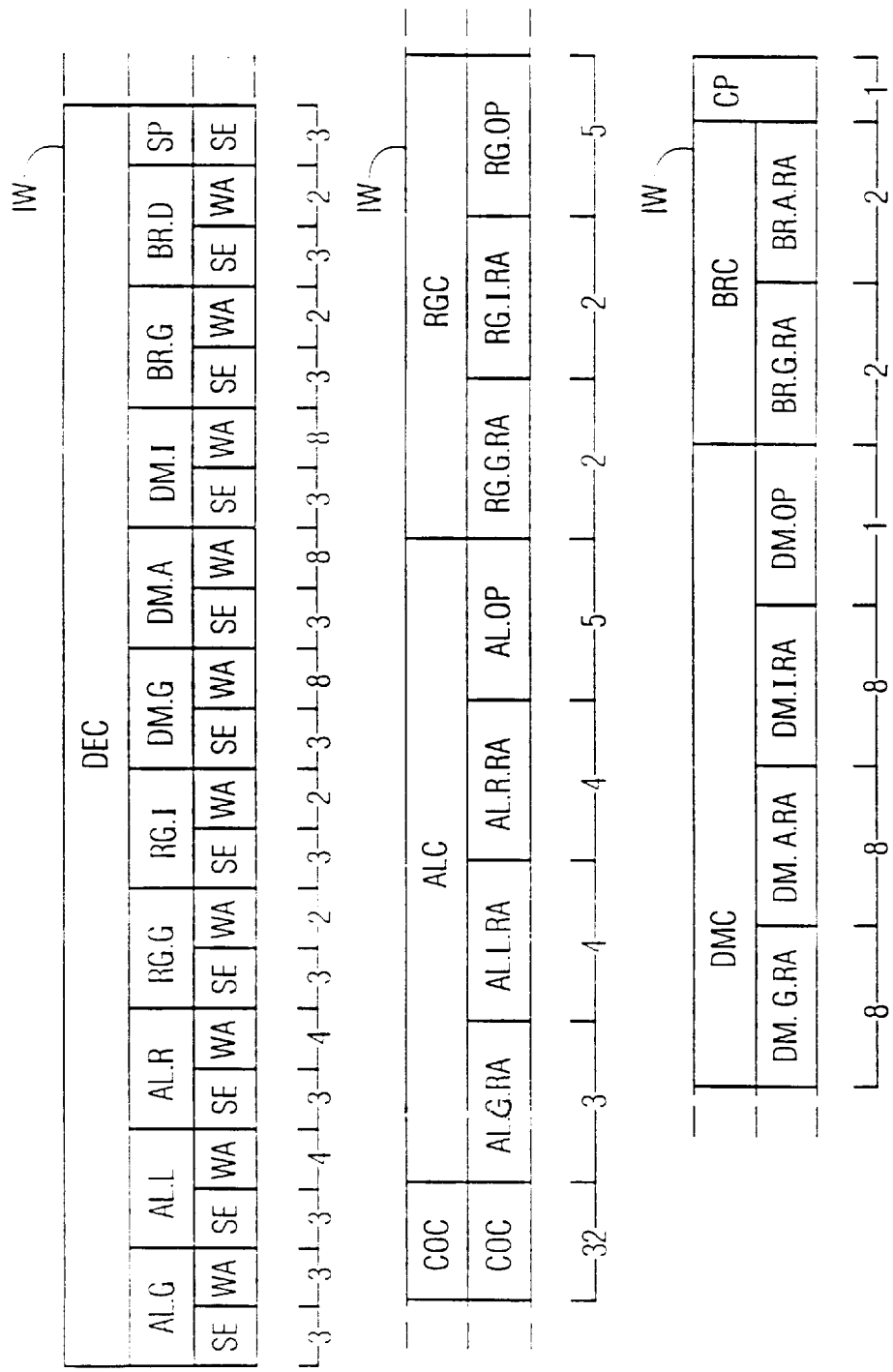
FIG. 2 shows the format of a very long instruction word in the device of FIG. 1.

FIG. 2 shows fields of the instruction word IW in more detail, with the number of bits in each field marked beneath that field. The purpose of these various fields will become apparent from the following detailed description of the structure and operation of the processor. The purpose of the checkpoint marking bit CP will be described further below, with reference to FIGS. 6 to 10 of the drawings.

Constant Unit CO has no operand inputs and one 32-bit result output (CO.O) connected to an input of memory circuit 30. Constant Unit CO in fact comprises a direct connection between the 32-bit field COC in instruction word IW (FIG. 2) and the output of Constant Unit CO. Constant Unit CO thereby enables constant values to be supplied from within the instruction word to the other units via the memory circuit 30.

Arithmetic and Logic Unit AL has a 1-bit guard value input (AL.G) and two (left and right) 32-bit argument inputs (AL.L and AL.R) connected to respective memory units within memory circuit 30. The unit AL has a 32-bit output (AL.O) connected back into memory circuit 30, and is controlled by a 16-bit field ALC of instruction word IW.

Figure 3:
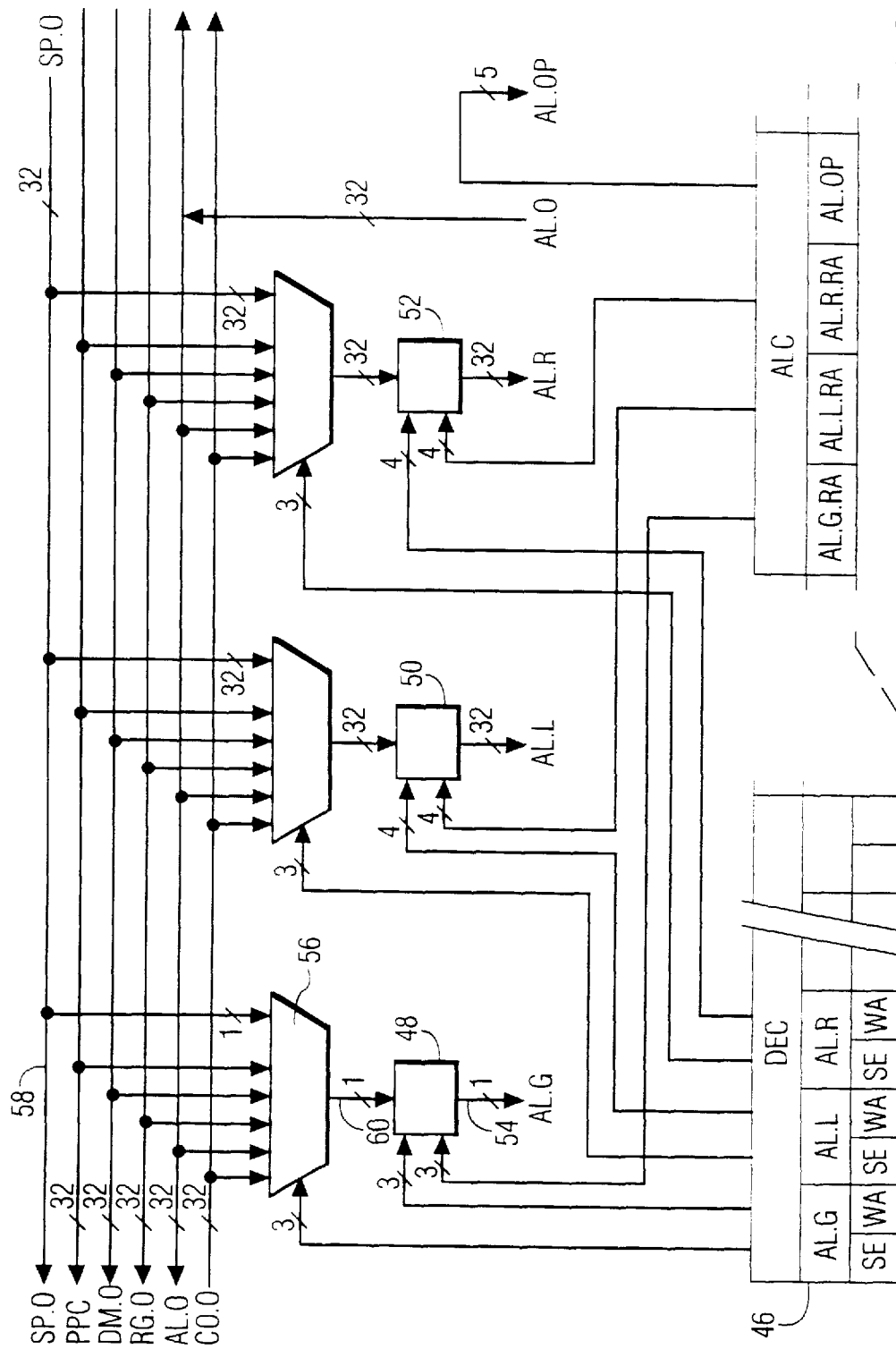
FIG. 3 shows a part of the imitation multiport memory in the device of FIG. 1.

FIG. 3 shows in detail the part of the imitation multiport memory circuit 30 associated with Arithmetic and Logic Unit AL. Within the memory circuit 30, separate memory units (RAM's) 48, 50 and 52 are associated with operands AL.G, AL.L and AL.R respectively. In contrast to some more conventional processing arrangements, no separate write enable signals are provided for the memory units in the device of FIGS. 1 to 9. Instead, at least one non-existent or at least non-writable storage location can be addressed when writing to that memory unit is not desired. The width of instruction word IW is reduced by the absence of the write enable bits, on the assumption that the value of these bits is already known at the time of scheduling, when results are allocated to specific memory unit locations.

The memory unit 48 for guard bit AL.G has eight 1-bit locations for storage of boolean values (TRUE/FALSE bits), including one non-writable location as just described. A 3-bit read address for memory unit 48 is supplied by Instruction Register 46 from a 3-bit field AL.G.RA in control field ALC of instruction word IW (see FIG. 2), and a 1-bit read port 54 of the memory unit supplies a guard bit AL.G to unit AL from the addressed memory location.

A multiplexer 56 has a number of 1-bit inputs connected to the least significant bits (lsb's) of the 32-bit bus lines which are connected to the result outputs (CO.O, AL.O, etc.) of the various functional units. An additional input of the multiplexer is connected to the lsb of an additional 32-bit bus line 58, which carries a delayed result output SP.O from a delay element in the form of a Special Register SP. The provision and use of delay elements for resolving collisions in this type of VLIW processor forms the subject of the copending parent application 594,534 mentioned above. The use of the lsb for the guard bits affords compatibility with certain programming conventions, including for example those of the 'C' language. In other environments the most significant bit (msb) or some other bit might be a more convenient choice.

The multiplexer 56 has a 1-bit output 60 connected to a write port of memory unit 48. The multiplexer 56 is controlled by a 3-bit selection field AL.G.SE in the Destination Control field DEC of instruction word IW. A 3-bit write address for the write port of memory unit 48 is provided by the adjacent 3-bit field AL.G.WA in the Destination Control field DEC.

In a similar manner, 32-bit memory units 50 (for AL.L) and 52 (for AL.R) have associated 32-bit multiplexers 62 and 64 respectively. Each has 16 locations, including one non-writable location. Destination Control field DEC contains two 3-bit selection fields AL.L.SE and AL.R.SE for controlling multiplexers 62 and 64 and two 4-bit fields AL.L.WA and AL.R.WA providing 4-bit write port addresses for memory units 50 and 52 respectively. Two 4-bit fields AL.L.RA and AL.R.RA in control field ALC provide read addresses for the read ports of memory units 50 (for AL.L) and 52 (for AL.R) respectively.

An op-code AL.OP for Arithmetic and Logic Unit AL is provided by a 5-bit field in control field ALC for unit AL. In each cycle, op-code AL.OP determines what operation (add, subtract, compare, AND, OR, etc.) is to be performed on the arguments AL.L and AL.R to generate the result AL.O.

Returning to FIG. 1, Register Unit RG provides on-chip storage for sixteen frequently used program variables of 32 bits each. The unit RG has associated memory units within memory circuit 30 for a guard bit RG.G and a 32-bit data input RG.I. These memory units have only four locations each, including one non-writable location. A data output (RG.O) is connected to an input of memory circuit 30 wherein it forms a respective bus line (RG.O, see also FIG. 3). Destination Control field DEC contains two 3-bit selection fields RG.G.SE and RG.I.SE for controlling the associated multiplexers and two 2-bit write address fields RG.G.WA and RG.I.WA for selecting between the four locations in the respective memory units.

Within the 9-bit Register Unit control field RGC, two 2-bit read addresses RG.G.RA and RG.I.RA are provided for selecting the location of the values RG.G and RG.I to be read from their respective memory units. A 5-bit op-code field RG.OP contains one bit to select between register read and register write functions, and four bits to select between the sixteen registers within unit RG. The location of a variable within Register Unit RG is therefore fixed by the compiler.

Data Memory Unit DM contains, at least conceptually, a larger amount of storage for variables. Unit DM comprises in practice an interface to an off-chip bank of read/write memory, as described in more detail below, with reference to FIG. 6. Within the imitation multiport memory circuit 30, separate memory units are provided for a guard bit DM.G, a 32-bit address word DM.A and a 32-bit input data word DM.I. These memory units have 256 locations each, including one non-writable location. Data Memory Unit DM has a 32-bit data output (DM.O) connected to an input of memory circuit 30 wherein it forms a respective bus line (DM.O, see also FIG. 3). Destination Control field DEC contains three 3-bit selection fields DM.G.SE, DM.A.SE and DM.I.SE for controlling multiplexers within memory circuit 30, and three 8-bit write address fields DM.G.WA, DM.A.WA and DM.I.WA for selecting between the 256 locations in each of the associated memory units.

Within the 25-bit Data Memory Unit control field DMC, three 8-bit read addresses DM.G.RA, DM.A.RA and DM.I.RA are provided for selecting the location of the values DM.G, DM.A and DM.I to be read from their respective memory units. A 1-bit op-code field DM.OP contains one bit to select between memory read and memory write functions. The address word DM.A defines the address for the writing of data word DM.I or the reading of data word DM.O. This allows the dynamic calculation of 32-bit addresses during running of programs, enough to address $2^{32}$ locations.

Branch Unit BR allows the sequence of instruction addresses PC generated by Sequencer SEQ to be modified to cause branching in the program execution. The unit BR has associated memory units within memory circuit 30 for a guard bit BR.G and a 32-bit destination address BR.A. These memory units have four locations each including a non-writable location. Destination Control field DEC contains two 3-bit selection fields BR.G.SE and BR.A.SE for controlling the associated multiplexers and two 2-bit write address fields BR.G.WA and BR.A.WA for selecting between the four locations in the respective memory units.

Within the 4-bit Branch Unit control field BRC, two 2-bit read addresses BR.G.RA and BR.A.RA are provided for selecting the location of the values BR.G and BR.A to be read from their respective memory units. Branch Unit BR simply passes guard bit BR.G and destination address BR.A to the Sequencer SEQ. No op-code field BR.OP is required. Within Sequencer SEQ, the boolean value of guard bit BR.G is tested. If BR.G is TRUE, then a branch is to be implemented and Sequencer SEQ makes the next value of PC equal to destination address BR.A received from memory circuit 30. If BR.G is FALSE, then Sequencer SEQ merely increments the value of PC to PC+1, addressing the next instruction in the stored program.

Therefore, by directing a logic result AL.O to the memory unit for BR.G (lsb TRUE or FALSE), conditional branching can be effected. Unconditional (always or never) branching can be effected by directing a constant result CO.O to the memory unit for BR.G, or by arranging that non-writable locations in that memory unit are permanently TRUE or permanently FALSE. This latter option is particularly convenient in the present embodiment, since at least one location in each memory unit is already non-writable, as described above. A guard bit BR.G=FALSE (branch never) will often be required when no branch operation is to be started in a given cycle.

Sequencer SEQ also produces a pseudo-program counter value PPC which is fed to an input of memory circuit 30 wherein it forms a bus line (PPC, see FIG. 3). The PPC can be used by other functional units, including Branch Unit BR, to implement program counter-relative addressing. For this purpose a read delay may be defined as the difference between the cycle number of an instruction reading a value PPC from the bus line into a memory unit and the cycle number of the instruction with PC equal to that value of PPC.

In operation, a branch delay of b cycles occurs between the cycle i in which a branch instruction is issued, and the first cycle i+b in which the instruction word IW(i+b) is affected by the branch instruction. The same boolean value which conditions the branch instruction can be directed to the guard bit inputs AL.G, RG.G, DM.G and BR.G and be used in the intervening cycles to conditionally inhibit state-changing operations scheduled for the various functional units during the branch delay, including further branches. Using knowledge of branching probabilities, the compiler is thereby enabled to schedule useful operations within the branch delay of an improbable conditional branch instruction, while ensuring a correct state in the minority of cases where the branch condition is met. To enable unguarded operations to be initiated most conveniently on these units, the non-writable location of each guard bit memory unit can be arranged to yield TRUE at its read port in response to the appropriate read addresses RA. The non-writable locations of the 32-bit operand memory units may also be arranged to yield some known, frequently required value, for example zero.

Only the contents of the off-chip memory, the registers of Register Unit RG and the program counter PC are considered part of the programmer-visible state of the processing device in the present embodiment. The imitation multiport memory circuit 30 is used by the compiler as a buffer for intermediate variables on a strictly temporary basis. Consequently, functional units such as Constant Unit Co do not require guarding. Arithmetic and Logic Unit AL is provided with guarding to avoid exceptions such as arithmetic overflows arising spuriously, even though unit AL cannot itself alter the programmer-visible state of the device.

In addition to the branch delay of Branch Unit BR, the scheduling compiler must have knowledge of the so-called 'latency' of every functional unit. The latency of a functional unit is defined as the difference between the number of the cycle in which an operation is started and the number of the cycle in which the result (AL.O etc.) of that operation is produced and directed by Destination Control field DEC to the desired location(s) in the imitation multiport memory circuit 30. The branch delay mentioned above may be considered as the sum of the latency due to Branch Unit BR and a latency due to Sequencer SEQ and the off-chip Instruction Issue Pipeline IIP.

Scheduling Example

For the purpose of the following example, it is assumed that the latencies for the functional units are as follows:

Unit CO - zero cycles latency;
Unit AL - 1 cycle latency;
Unit RG - 1 cycle latency;
Unit DM - 2 cycles latency; and
Unit BR - 5 cycles branch delay.

Listing 1 below comprises a fragment of high level language source code. Two records in memory are pointed to by variables p and q. The aim of the program is to cause copying of two 32-bit values from fields in the q record to two corresponding fields in the p record.

Figure 4:
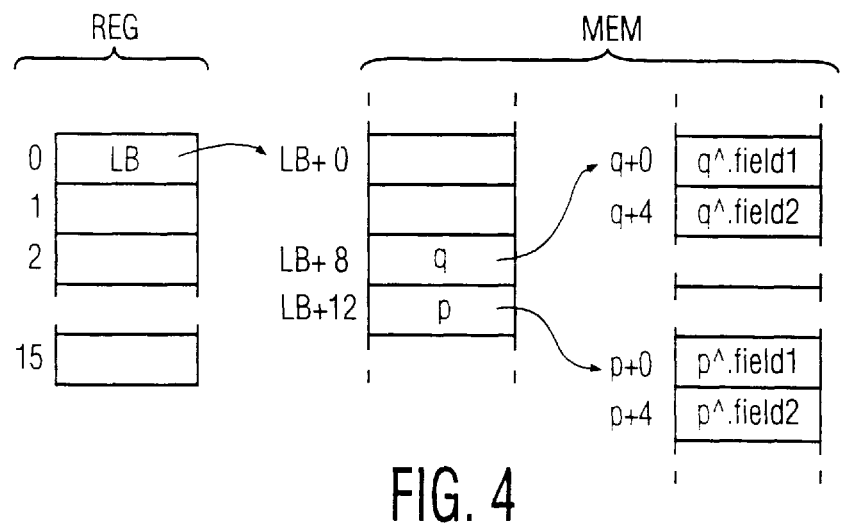
FIG. 4 illustrates the operation of a first example program fragment.

Listing 1 p^.field1:=q^.field1;
p^.field2:=q^.field2;

FIG. 4 illustrates one possible organization of data that might be used to implement the high level instructions of Listing 1. Storage for program variables is provided by a high-speed register file REG, having sixteen locations numbered 0 to 15, and a larger bank MEM of (offchip) read/write memory. A Local Base address LB is stored in location 0 of register file REG. The address LB points to the start of a table of variable values in memory bank MEM, wherein the two record pointers p and q are stored at locations LB+12 and LB+8 respectively. Each variable p and q is a pointer to the start of the corresponding record, located elsewhere in memory bank MEM. The first field of each record is stored at an offset of zero from the address defined by the relevant pointer variable. The second field of each record is stored at an offset of four from the relevant pointer variable. Thus the value q^.field2 can be read from the location whose address is q^30 4.

Listing 2 shows an intermediate code fragment, labelled T1, that might be generated by a compiler to execute the high level instructions of Listing 1 on a VLIW processor, assuming the data organization described above with reference to FIG. 4. Each line of Listing 2 defines a single primitive operation Op001 to Op014 to be scheduled for execution by a suitable functional unit. A comment (*. . . *) at the end of each line first mentions the type of functional unit required (AL, RG, CO etc.) and then describes the result (output) of that operation. The references 001 and 002 in operation Op003 (for example) indicate that the operands for Op003 are the results of Op001 and Op002 respectively. Thus the effect of operation Op003 is to add the results of operations Op001 and Op002, while the effect of operation Op009 is to write the result of Op008 into the off-chip data memory at a location addressed by the result of Op004. Combining this information with the description of FIG. 4 above, the purpose of each operation Op001 to Op014 in Listing 2 in implementing the function specified by Listing 1 should be self-explanatory.

Listing 2

T1:
| Op001 | rdreg(0); | (* RG, Local Base address *) |
| Op002 | constant(12); | (* CO, offset value for p *) |
| Op003 | aplus 001 002; | (* AL, address of p *) |
| Op004 | read 003; | (* DM, p *) |
| Opo05 | constant(8); | (* CO, offset value for q *) |
| Op006 | aplus 001 005; | (* AL, address of q *) |
| Op007 | read 006; | (* DM, q *) |
| Op008 | read 007; | (* DM, q^.field1 *) |
| Op009 | write 004 008; | (* DM, p^.field1 := q^.field1 *) |
| Op010 | constant(4); | (* CO, offset for field2 *) |
| Op011 | aplus 004 010; | (* AL, address of p^.field2 *) |
| Op012 | aplus 007 010; | (* AL, address of q^.field2 *) |
| Op013 | read 012; | (* DM, q^.field2 *) |
| Op014 | write 011 013; | (* DN, p^.field2 := q^.field2 *) |
GOTO EXIT It will be appreciated that the intermediate code fragment T1 is listed sequentially, and is not specific to any particular configuration of VLIW processor, provided that at least one functional unit is suitable to perform each operation. Once the compiler has arrived at the collection of such fragments that make up an application program, and once the actual device configuration is known, it is the task of a scheduler to map each operation of the fragment to a particular functional unit of the device in a particular cycle. The scheduler operates with a set of constraints defined by the structure of the particular VLIW processor. These constraints include primarily the number and type of functional units available in the target VLIW processor, and the latency of each functional unit. Other constraints include the number of locations in each memory unit of the imitation multiport memory. These locations are allocated dynamically by the scheduler as required. For the purpose of the simple scheduling problem presented by the fragment T1, it will be seen that the number of locations in each memory unit in the VLIW processing device of FIGS. 1 to 4 is sufficient that the limited capacity of the memory units need not be considered as a constraint in the present description. The latency for each operation is important because operations dependent on the results of other operations must not be scheduled until the latencies of all those other operations have expired. Thus, for example, operation Op009 must be scheduled at least 2 cycles later than Op004 (DM latency is 2) and at least 2 cycles later than Op008. Similarly, operation Op011 can be scheduled in the same cycle as Op010 (CO latency is zero), but must be at least 2 cycles later than Op004 (DM latency is 2). This assumes that simultaneous write and read of a memory unit location is possible. Otherwise a further one cycle latency may be needed for each type of operation.

FIG. 5 shows three different schedules (I, II and III), each mapping the intermediate code fragment T1 onto the specific VLIW processor described above with reference to FIGS. 1 to 4. Each row of each table represents one very long instruction word IW, and hence one machine cycle. Cycle numbers are given in the left-most column, headed Cy. The next five columns represent the five control fields COC, ALC, RGC, DMC and BRC for the five functional units (CO etc. in FIG. 1). Each control field begins an operation on its respective functional unit. Thus in Schedule I, Cycle 0, field COC instructs Constant Unit (CO in FIG. 1) to begin Op005, so that result CO.O=8 appears at the output of unit CO in the same cycle (CO latency is zero). Similarly, the register reading operation Op001 is initiated in Cycle 0 by field RGC. The value LB of the Local Base address is thus RG.O in Cycle 1 (RG latency is 1). The selection fields DEC.—.-.SE of Destination Control field DEC in each instruction are represented to the right of the functional unit control fields. These fields direct the results of the various operations Op00114 Op014 into respective memory units as such results become available. The scheduler takes account of the latencies of the various functional units in defining Destination Control field DEC. Thus, for example, result RG.O of register reading operation Op001, started by field RGC in Cycle 0, is directed to the left operand memory unit of Arithmetic and Logic Unit AL by field DEC.AL.L.SE in the following instruction, Cycle 1. This is indicated by the code RG in the AL.L column in Schedule I, Cycle 1. Similarly, memory reading operation Op007 is started by field DMC in Cycle 2, while result DM.O of that operation is directed to the address memory unit of Data Memory Unit DM by setting field DEC.DM.A.SE to 'DM' in Cycle 4 (DM latency is 2).

The scheduler adds its own operations Nw015 and Nw016 to effect a jump to the next fragment ('GOTO EXIT' in Listing 2). Nw015 uses Constant Unit CO in Cycle 1 to define the target address for the branch, which is directed to the address memory unit of Branch Unit BR by setting selection field DEC.BR.A.SE to 'CO' in Cycle 1. Nw016 uses branch control field BRC, also in Cycle 1, to initiate an unconditional (BR.G=1) branch to the target address. The long branch delay of 5 cycles ensures that transfer of control to the target address does not occur until Cycle 8, after fragment T1 has completed. In other words, the branch operation has been brought forward in the schedule so that useful operations can be scheduled for execution during the branch delay. It may be noted that only about one third of the potential maximum number of operations are actually scheduled in FIG. 5, Schedule 1. This is due to the very small size of the example fragment, and it will be understood by those skilled in the art that a higher proportion of useful operations can be scheduled when scheduling a longer fragment, because of the higher degree of parallelism inherent in longer fragments. The large number of conditional branching operations inherent in longer fragments is overcome in the embodiment described by use of the boolean-valued guard bits .G, exploiting the fact that most conditional branches can be arranged to have a branch probability close to one or close to zero. For example, a loop to be executed 100 times will involve a branch which can be predicted to occur with a probability of 0.99 or 0.01.

The Schedule I in FIG. 5 could have been executed by a VLIW machine having a true multiport memory, ignoring the Destination Control field DEC altogether. However, Schedule I contains a collision for access to a memory unit of the imitation multiport memory, and is thus not a valid mapping of operations Op001–Op014 onto the processor of FIGS. 1 to 4. Specifically, in Cycle 5 of Schedule I, result DM.O of Op004 is destined for the left operand memory unit (AL.L) of Arithmetic and Logic Unit AL and for the address memory unit (DM.A) of Data Memory Unit DM. In the same Cycle 4, result AL.O of Op012 is also destined for the address memory unit (DM.A) of Data Memory Unit DM. This collision is marked by the code XX in field DEC.DM.A.SE in Cycle 5, Schedule I.

In the absence of the delay element (Special Register SP), the scheduler would be forced to reschedule these operations when it discovered the collision, until the constraints of the processor hardware are satisfied. In the present example, this might lead to Schedule II of FIG. 5. In Schedule II, Op004 has been delayed by one cycle, to start in Cycle 4. Dependent on the result of Op004, however, are operations Op009, Op011, and Op014, which must therefore also be delayed by at least one cycle. These operations were interleaved in Schedule I with other operations Op012, Op008, Op013 and Op014, which must also be rescheduled because of the constraints of the hardware.

This process of rescheduling, or 'backtracking', can always be completed to satisfy the hardware constraints, but the rescheduled fragment Ti now occupies 9 cycles instead of 8. This means that this part of the application program takes 8 longer than it would in an ideal VLIW machine having the same functional units. Furthermore, backtracking involves the compiler in extra work, including the resolution of fresh collisions that arise in resolving the first collision. The problem of increased compiler effort becomes especially acute in larger machines, where a collision might occur almost every cycle. It will be apparent that the existence of a collision is not generally detected until several instructions have been scheduled beyond the cycle in which the collision occurred. In a large machine of ten or more functional units, this will necessitate the rescheduling of tens or even hundreds of operations, with the potential for new collisions to arise just as frequently during the rescheduling.

FIG. 5, Schedule III represents the resolution of the example collision without backtracking, using the delay element in the form of Special Register SP, as described more fully in the copending parent application 594,534. The selection field DEC.SP.SE in Destination Control field DEC is shown at the right in Schedule III. It will be seen that the scheduling of operations Op001–Op014 and Nw015–Nw016 is almost identical to that of Schedule I (true multiport memory). In Schedule III, however, the collision in Cycle 5 between the two results destined for the DM.A memory unit is resolved by directing the result DM.O of Op004 in to the Special Register, that is by setting field DEC.SP.SE to 'DM' in Destination Control field DEC. The field DEC.DM.A.SE is then set to 'SP' in Cycle 6 to direct the delayed result of Op004 to the DM.A memory unit in time for it to be read by Data Memory Unit DM in Op009, Cycle 6.

The delayed result of Op004 now collides in Cycle 6 with the result of Op011, both being destined for the DM.A memory unit. In Schedule III, the start of Op011 has therefore been delayed to Cycle 6, with no consequential effect on any other operations. An alternative solution to this second collision would have been to leave Op011 in Cycle 5, while delaying the result of Op011 by setting field DEC.SP.SE to 'AL' in Cycle 6. The delayed result of Op011 could then have been directed to the DM.A memory unit in time for the start of Op014 by setting field DEC.DM.A.SE to 'SP' in Cycle 7.

Special Register SP will always be effective to maintain the performance level of a true multiport machine while avoiding backtracking, so long as only a single, two-value collision arises in any given cycle. This follows from the fact that a functional unit can only read one value from a memory unit in each cycle, which means that one of the colliding results will always be required before the other. If, for the sake of argument, the result of Op011 had turned out to be more urgently required than the result of Op004, the result of Op004 could have been delayed by two cycles, or any number of cycles, until finally it became more urgent than a colliding result. In all cases, the need for consequential rescheduling of other operations can be avoided.

Substantial freedom is also available in choosing the number and type of functional units to be included. While each unit in the specific embodiment of FIG. 1 is specialized to some extent for performing a specific function or group a functions, groups of these functions could all be combined in a more general multi-purpose type of functional unit, for maximum flexibility in scheduling. A disadvantage of this type of unit is that it is desirable to have the same latency for all operations on a given unit, to allow full pipelining. This means that the faster operations (such as constant generation) must be slowed down to the speed of the slowest operations. On the other hand, more specialized functional unit types may also be useful in a given application, performing for example floating-point multiplication, barrel shifting or input/output functions. The same types of units as are used in conventional microprocessors are well suited or readily adaptable by the person skilled in the art for inclusion in a processing device according to the present invention.

Memory Interface Circuit With Exception Recovery

Figure 6:
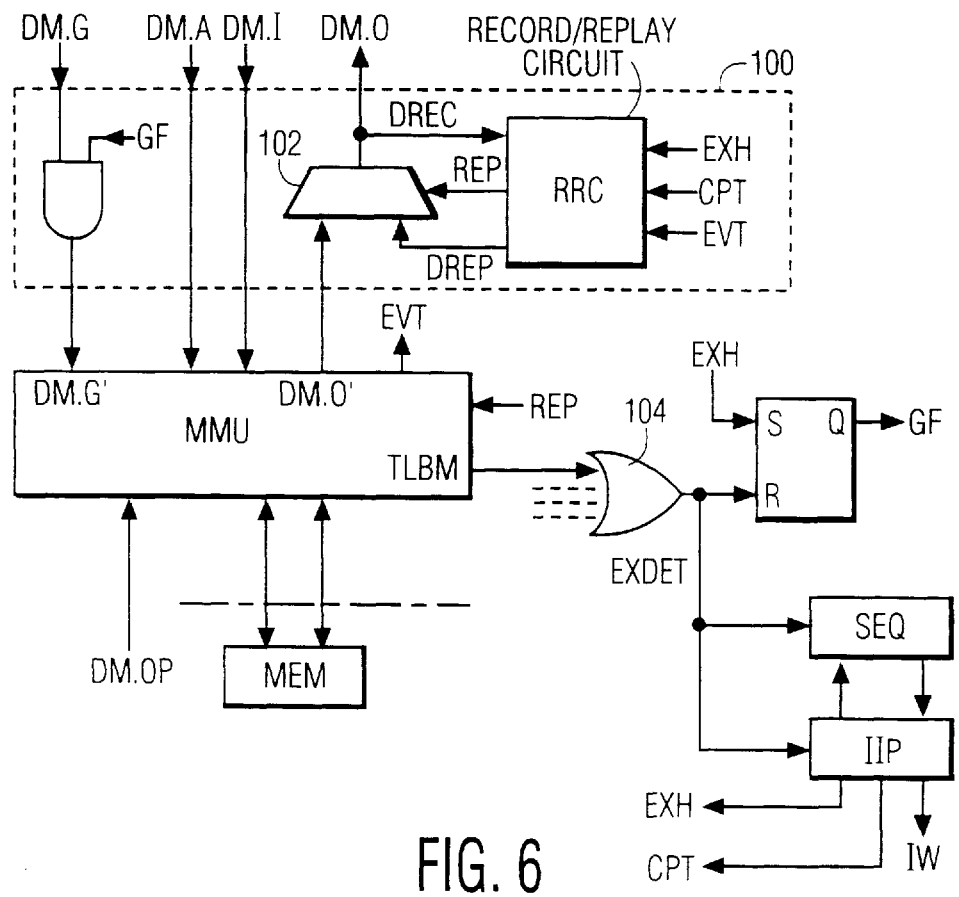
FIG. 6 shows a part of the processing device, including exception detection and recovery circuitry.

FIG. 6 shows the structure of a memory interface circuit suitable for use as the Data Memory Unit DM of the processing device of FIGS. 1 to 4. Signals DM.G (guard bit), DM.A (address) and DM.I (write data) are received from the Imitation Multiport Memory 30 (see FIG. 1). A Memory Management Unit (MMU) receives these signal via some exception recovery circuitry 100 (not shown in FIG. 1), and supplies signal DM.O (read data) to memory circuit 30, also via the circuitry 100. The op-code signal DM.OP (read/write) is received from the Instruction Register 46 (see FIG. 1). The MMU provides an interface to a large off-chip main memory MEM, and in particular implements virtual memory addressing in a manner familiar per se to those skilled in the art.

Within the exception recovery circuitry 100, the signals DM.A and DM.I are unaffected, while the guard bit DM.G is AND-ed with a guard forcing signal GF before being passed as signal DM.G' to the MMU. While signal GF remains at logic '1' (TRUE), signal DM.G' equals signal DM.G. When signal GF goes to logic '0' (FALSE), however, DM.G' is forced to '0' (FALSE). The guard forcing signal GF is ANDed in a similar manner (not shown) with the guard bits AL.G, RG.G and BR.G of the other functional units in the processing device of FIG. 1.

The exception recovery circuitry 100 also includes a multiplexer 102 and record/replay circuit RRC. The circuit RRC controls the multiplexer 102 by means of a replay mode signal REP. While REP is at logic '0', the multiplexer transmits signal DM.O', produced by the MMU, to the imitation multiport memory circuit 30 as signal DM.O. When REP is at '1', however, a replay data signal DREP, produced by record/replay circuit RRC, is transmitted to memory circuit 30 in place of DM.O'.

The replay mode signal REP therefore distinguishes a record mode, in which DM.O=DM.O', from a replay mode, in which DM.O=DREP. Record/replay circuit RRC also takes a signal DREC=DM.O from the output of the multiplexer 102.

In normal operation (characterised by signals GF='1' and REP='0') the dashed box 100 is effectively transparent, so that DM.G'=DM.G and DM.O=DM.O'. The MMU receives in each cycle a request to read a value DM.O from location DM.A in main memory MEM or, dependent on the op-code DM.OP and subject to the condition DM.G=TRUE, to write a value DM.I to location DM.A in main memory MEM. The MMU supplies to the record/replay circuit RRC an event signal EVT which indicates (EVT=1) the availability of a value DM.O read from the memory MEM.

The MMU also supplies a TLB miss signal TLBM, to be described below, to an input of an OR gate 104, whose output carries an exception detection signal EXDET to the Sequencer SEQ and Instruction Issue Pipeline IIP (see FIG. 1). Other inputs of the OR gate 104 are available to receive exception raising signals from other functional units. Signal EXDET is also applied to the reset (R) input of a set-reset flip flop 106, which is clocked once every machine cycle. The Instruction Issue Pipeline IIP generates and supplies to the record/replay circuit RRC an exception handling signal EXH and a checkpoint signal CPT. The exception handling signal EXH is also applied to the set (S) input of flip flop 106, while the output signal (Q) of the flip flop 106 constitutes the guard forcing signal GF.

Figure 7:
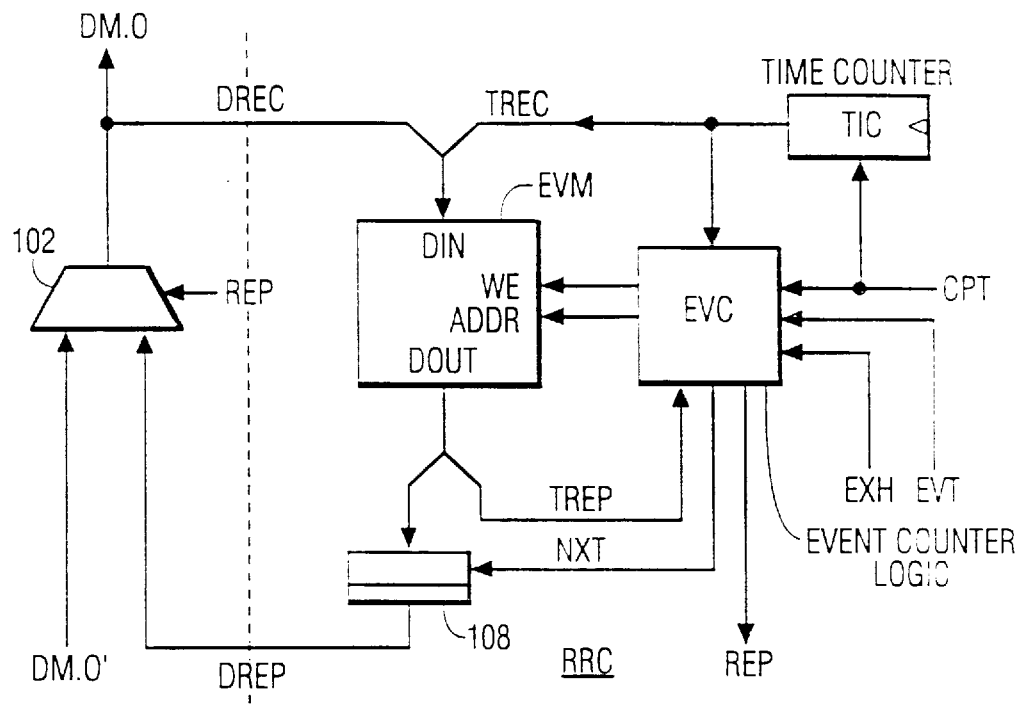
FIG. 7 shows in more detail a record/replay circuit of the processing device.

FIG. 7 shows the record/replay circuit RRC in more detail. A time counter TIC, clocked once every machine cycle, receives the checkpoint signal CPT and generates a time signal TREC. The time signal TREC is applied in concatenation with the signal DREC to a data input (DIN) of an event memory EVM. Since the signal DM.O has 32 bits, and assuming a width of 8 bits for the time signal TREC, the data input of the event memory EVM has a width of 40 bits. Time signal TREC is also supplied to an event counter logic circuit EVC, as are the checkpoint signal CPT, the event signal EVT and the exception handling signal EXH. The logic circuit EVC controls the event memory EVM by means of address and write enable signals ADDR and WE respectively.

The event memory EVM has a 40-bit data output DOUT, out of which an 8-bit event time signal TREP and a 32-bit replay data signal are applied to the logic circuit EVC and a latch 108 respectively. The latch 108 is clocked by a next event signal NXT supplied by the logic circuit EVC, while the latch output supplies the replay data signal DREP to the multiplexer 102.

A detailed explanation of the construction and operation of memory management units for virtual memory operation, which are well known to those skilled in the art, is not needed here for an understanding of the present invention. In summary, the MMU of this embodiment contains a Translation Lookaside Buffer (TB or TLB), which in turn contains a number of entries mapping virtual addresses (DM.A) to physical addresses in the memory MEM. Only a subset of the possible addresses can be mapped by the TLB at a given time, and a request for a read or write to an address DM.A can only be met within the Data Memory Unit latency (2 cycles in the present embodiment) if it can be mapped by an entry existing in the TLB. If the address DM.A cannot be mapped by an existing entry, this constitutes an exception, and the program execution must be interrupted. Since this so-called TLB miss can be resolved by making a new TLB entry (deleting an existing entry), the TLB miss is termed a 'non-fatal' or 'recoverable' exception. A signal TLBM=1 is used by the MMU to indicate the occurrence of a TLB miss and initiate the exception handling and recovery process.

Execution Example With Exception Recovery

FIG. 8 illustrates schematically a second example program fragment, which has already been scheduled into a number of very long instruction words (see IW, FIG. 2), stored at program counter locations PC=0, 1, 2 et seq. Not all scheduled operations are shown, but there are shown five operations which when executed will increment by 1 the value stored at a certain location in the main memory MEM. The fragment deliberately makes no use of values already present in the imitation multiport memory circuit 30. Thus the relevant machine state at PC=0 resides entirely in the Data Memory Unit DM (main memory MEM) and the registers of the Register Unit RG. Furthermore, no operations are scheduled before PC=0 that will not have completed before PC=0. PC=0 can therefore be designated a checkpoint instruction, indicated in FIG. 8 by the asterisk '*'. Note that this latter condition is not always essential, provided that control flow is 'divergent' at the checkpoint, meaning that the immediate history (pipeline contents) is always the same upon arrival at the checkpoint.

Upon entry to the second example fragment at PC=0, a pointer to the relevant memory location is stored in register 0 of the Register Unit RG. An operation 'rdreg(0)' initiated at PC=0 copies the pointer from there to a temporary location t1 in the imitation multiport memory circuit 30, where it is received at PC=1 (RG latency is 1). An operation 'read t1' initiated at PC=1 reads the value stored in the relevant memory location into a second temporary t2, where it is received at PC=3 (DM latency is 2). Meanwhile, an operation 'constant(1)' initiated at PC=2 loads the increment value 1 into a third temporary t3 (CO latency is 0). An operation 'aplus t2 t3' initiated at PC=3 places the sum of the value from memory t2 and the increment t3 into a fourth temporary t4, where it is received at PC=4 (AL latency is 1). Finally, an operation 'write t1 t4' initiated at PC=4 writes the incremented value t4 back to the main memory location, still indicated by temporary t1, where it arrives (assuming no TLB miss) at PC=6.

The waveform diagram FIG. 9 illustrates the exception recovery process using the circuitry of FIGS. 6 and 7, on the assumption that an exception (for example a TLB miss) is detected while at PC=5 in the execution of the second example program fragment of FIG. 8. The top row 'PC =' in FIG. 9 depicts the program counter values of the construction being issued out of the IIP pipeline in successive cycles of the processing device, beginning at PC=B with a branch to the checkpoint PC=0. Below that there are shown waveforms for the signals CPT, TREC (time signal counter value is shown), EVT, EXDET, GF, EXH and REP. At the start of the waveforms, signals CPT, EVT, EXDET, EXH and REP are all at '0', and GF is at '1', indicating normal operation (record mode, no exceptions being handled). The time counter signal TREC is counting cycles since the previous checkpoint (not shown).

Checkpoint instructions are indicated in program memory by setting of the bit CP='1' in a relevant instruction word (see FIG. 2). In the present embodiment, the bit CP is set in the instruction PC=B which initiates the branch operation to the checkpoint, rather than being attached to the checkpoint instruction itself. This measure provides five cycles' advance warning of each checkpoint, thanks to the branch delay, relaxing timing constraints on those circuits which generate the checkpoint signal CPT='1', or are otherwise responsive to checkpoints. Of course, signal CPT='1' is not generated if the branch operation is guarded FALSE (BR.G= FALSE and/or GF=0). Towards the end of the last cycle PC=L of the branch delay the checkpoint signal CPT is set (to logic '1') by the Instruction Issue Pipeline IIP in time for the beginning of the cycle marked 'C', where PC=0 for the first time.

The checkpoint signal CPT=1 causes the Sequencer SEQ to memorize the PC value of the checkpoint, in case it should be necessary to return to it following an exception. The checkpoint signal CPT=1 also causes the time counter TIC within record/replay circuit RRC (FIG. 7) to reset to zero (TREC=0), and the event counter logic circuit EVC to set address ADDR to zero, effectively clearing the event memory EVM. The time count signal TREC is incremented in each subsequent cycle to act as a measure of time elapsed since the checkpoint. The event signal EVT is set by the MMU in time for the cycle marked T (PC=3), when the value read from memory is first available (in the form of signal DM.O=DM.O') from the Data Memory Unit DM. In response to the event signal EVT=1, event counter logic circuit EVC sets the write enable signal WE of event memory EVM, causing the record data signal DREC= DM.O=DM.O' to be stored in a first location of the event memory EVM, together with a 'time stamp' in the form of the time count signal TREC, currently equal to 3. Following this, the event memory address ADDR is incremented ready for storing the next event.

At E (PC=5), the TLB miss or other exception occurs, as indicated by the exception detection signal EXDET=1. This causes flip flop 106 to generate the guard forcing signal GF=0 while execution continues to PC=6 and PC=7. These two cycles 0 allow any operations initiated before the exception, including for example the operation 'write t1 t4', to complete their execution. These and other operations initiated before the exception is detected have therefore altered the machine state from the well-defined state that was present at the checkpoint. Although new operations may be initiated in these two cycles, the guard forcing signal GF=0 ensures that no operations initiated after the exception has arisen can affect the machine state, so that the machine state is correct at time R.

The two-cycle delay between E and R is used also by the Sequencer and Instruction Issue pipeline to transfer control to an exception handling routine (PC=X) which sets up a new entry in the TLB of the MMU, in the case of a TLB miss exception. It may be noted that this delay is shorter than the normal branch delay, to minimize the time penalty for exception handling. The duration of the exception handling routine is marked by the signal EXH=1, arising at time R, in response to which the guard forcing signal GF returns to '1' and the time counter TIC stops counting (TREC=7).

The exception handling routine operates with a small area of memory which is permanently and directly addressable. By this means, and appropriate programming, it is guaranteed that the exception handling routine will never itself give rise to a non-fatal exception. This measure is known per se to the person skilled in the art, for example from the reference Colwell et al cited above. The operations required of the exception handling routine are dependent on the MMU, in a manner well known to those skilled in the art, and further description of these is not needed for an understanding of the exception recovery process being described herein. Note also that exception handling may also be performed by special hardware, without explicit provision by the programmer. In 680x0 processors, for example, special 'table walk' hardware is provided to handle the TLB miss exception.

Towards the end of the exception handling routine, the Sequencer SEQ recovers the PC value of the most recent checkpoint (PC=0 in the example) and enters it into the Instruction Issue Pipeline IIP, so that the instruction word IW stored at PC=0 is loaded into the Instruction Register 46 at the time marked C' in FIG. 9, thereby initiating the re-execution of the second example program fragment, starting from the checkpoint PC=0. The checkpoint signal CPT is set in time for this cycle, in response to which time counter TIC in the record/replay circuit RRC resets time signal TREC to zero and begins counting cycles again from the checkpoint. The event counter logic circuit EVC resets the address ADDR of the event memory to zero, so that the value DREC recorded at T and the time stamp TREP=3 are available at data output DOUT of event memory EVM.

For the re-execution, event counter logic circuit EVC sets the replay selection signal REP=1. The multiplexer 102 therefore breaks the data path for the signal DM.O', supplied by the MMU, and substitutes the replay data signal DREP, produced from event memory EVM via latch 108. At time T' in the re-execution, circuit EVC detects equality between the current time signal TREC and the stored time stamp TREP, and uses signal NXT to enter the value recorded at time E in the original execution into latch 108. Therefore the value DM.O supplied to the imitation multiport memory circuit 30 at time T' is the value that was originally in the memory MEM at time T, and not the incremented value that was stored there by the operation 'write t1 t4' in the original execution of the program fragment.

It can thus be seen that, during replay mode, values dependent on the previous, correct machine state are supplied from event memory EVM, in place of values dependent on the actual machine state, which is ill-defined because of the exception. At PC=6 in the re-execution, the operation 'write t1 t4' merely overwrites the incremented value stored in the memory MEM in the original execution with the same value. Since only correct inputs are received (as if) from the machine state during re-execution, correct outputs to the machine state are guaranteed. In fact it is preferable in practice that all read and write operations be suppressed during replay mode, for reasons that are explained under a separate heading below.

Returning to the execution example of FIGS. 8 and 9, circuit EVC resets the replay signal REP just before time R' (PC=8), when the re-execution goes beyond the point where execution was interrupted to handle the exception. This causes any further events (data transfers) to be appended to the previously recorded events (up to event T) in the event memory EVM, and so enables a correct recovery in the case of any further exception(s) which might require re-execution from the same checkpoint.

In larger processing devices, a number of data memory units DM may be provided, enabling multiple accesses to the main memory MEM in each cycle. In such an embodiment, of course, a record/replay circuit will be required for each data path from the main memory MEM. Some elements of the circuit RRC, for example the time counter TIC, can be shared between two or more such circuits, since the entire processing device operates synchronously. Note also that these further memory units will ideally provide additional ports to the same main memory space MEM, rather than to further isolated memories, in order to increase the scope for parallel processing.

Since the Register Unit RG also contains programmer-visible machine state, it too is provided with exception recovery features. However, since the amount of state in unit RG is very small, backup copy registers are used to store the state at each checkpoint, in the conventional manner, as described for example by Hwu and Patt in the reference cited above. The exception recovery features of the Register Unit will therefore not be described further, in the interest of brevity. Those skilled in the art will appreciate that, as an alternative, the (or each) Register Unit output data path (RG.O) could include a record/replay circuit, for example if the number of registers is too large for complete backup copies to be accommodated economically.

In yet further embodiments, the content of the imitation multiport memory itself could be included in the definition of the machine state, in which case each memory unit (26, FIG. 1) would be provide with exception recovery features in the form of a backup memory unit or a record/replay circuit, depending on the size of the memory unit in question.

Record/Replay Circuit Without Time Stamping

Figure 10:
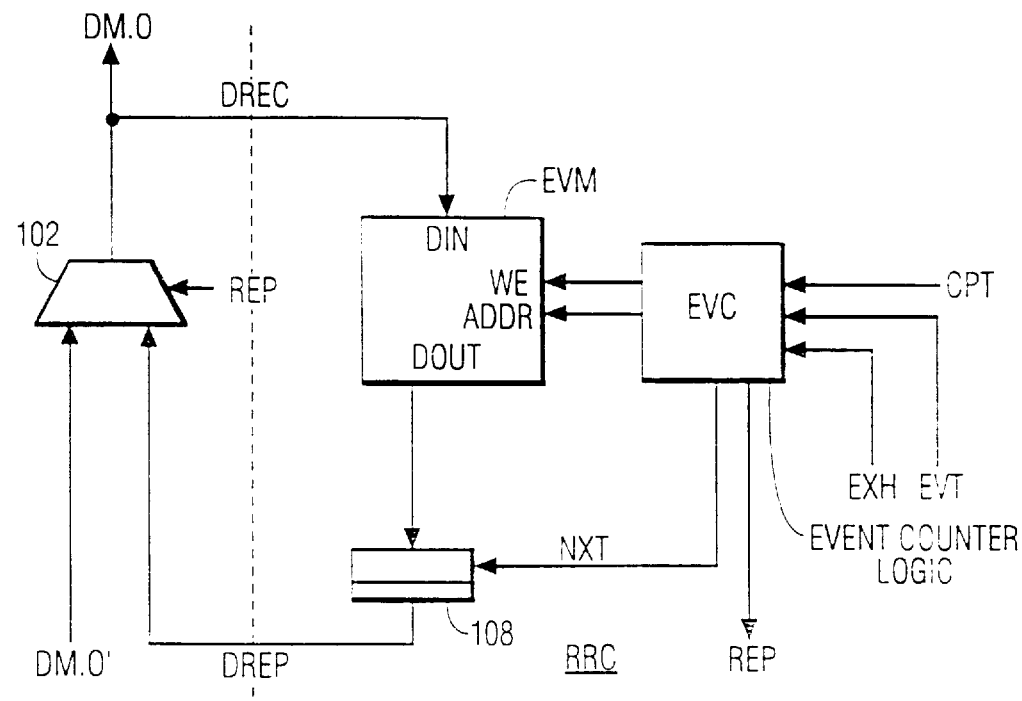
FIG. 10 shows in detail an alternative embodiment of the record/replay circuit of the processing device.

FIG. 10 shows an alternative embodiment of the record/replay circuit of FIG. 7, in which the time counter TIC is not provided, and time stamp values (TREC) are not stored with the data entries in the event memory EVM. Clearly this reduces the size of the event memory, as well as simplifying the control circuitry around it, but relies on the fact that the event signal EVT (generated by the MMU - FIG. 6) occurs at time T' during replay, just as it did at time T during the first execution of the checkpointed instructions. In this alternative embodiment, therefore, the record/replay circuit provides effectively a 'first-in, first-out' or FIFO memory which, during record mode, stores a new value DREC whenever the event signal EVT is asserted, and during replay mode reproduces a next stored value DREP when the event signal is asserted.

Of course, event memory control circuit EVC still maintains a count of the number of values actually recorded since the checkpoint, in order to generate address ADDR, and to effect the changeover from replay to record mode when the re-execution passes the point at which the exception interrupted it at the previous attempt. For the simplified embodiment of FIG. 10, of course, the system designer also has to ensure that the starting value of address ADDR, and the number of assertions of event signal EVT, correspond exactly in both record and replay mode, or the replay values will no longer reproduce the correct recorded values.

Suppression Of Memory Accesses In Replay Mode

Modifications of the above embodiment may be required in practical systems. For example, it is described above that in the re-execution of the second example program fragment (FIGS. 8 and 9) the instruction 't2 - read t1' is re-executed, and later the instruction 'write t1 t4' is allowed to proceed and overwrite the value written by the same instruction during the original execution. While the incorrect value read from address t1 is ignored, and while the value overwritten at address t1 is correct, it will generally be desirable to inhibit the actual read and write operations during replay mode.

The reason for this is that often the action of accessing a memory location triggers other events, which would therefore be repeated undesirably. In particular, input/output devices such as UARTs for serial communication are often addressed as mere memory locations ('memory mapped'). In such a case, however, the action of writing the same value twice to the memory location will cause the value to be transmitted twice to a remote device: instead of receiving the character string 'DATA', the remote device might receive 'DAATA'. Similarly, the action of reading a received character from a UART register will normally signal to the UART that the word is accepted by the processor, such that repeating the read will yield the next character, not the same one. Thus, where a remote device transmits the string 'DATA', the processor might only receive 'DAA'.

Even without memory mapped I/O devices, repeating memory read operations can trigger unforseen events in a virtual memory system. For example, suppose that in the execution of instruction 't2 - read t1' in the second example program fragment, the memory location ti is correctly accessed and the data transfer recorded in the event memory EVM. Suppose further that, in the course of handling the exception, the page of memory including location t1 is discarded to make room for a new page reference in the TLB. When the re-execution begins from the checkpoint, performing the memory read operation which was successful last time around will now cause a TLB miss exception, even though the value required is safely recorded in the event memory EVM. Clearly this situation is undesirable, and for this reason too it is extremely desirable to arrange that memory accesses are effectively suppressed during the replay mode.

Elimination Of Control Pipelining

The reader should note that, by giving the compiler knowledge of the timing of each type of operation in more detail than a simple latency value, the designer can often eliminate or reduce "control pipelining". This technique eliminates many delay circuits from processing device, thereby reducing the physical circuit size. Instead, the compiler uses its detailed knowledge to schedule the different bit fields associated with a given operation individually, so that each bit or bit field is not loaded into the instruction register 46 and presented to the functional circuitry until the machine cycle in which it is actually required.

For example, suppose that in a certain cycle (PC=i) we wish to begin an operation to be performed by a functional unit having a latency of four cycles. In a practical embodiment of the processing device described herein, a guard selection field (—.G.RA) for the unit may be issued at PC=i+0, an op-code (—.OP) issued at PC=i+1, one or more argument selection fields (—.-.RA) may be issued at PC=i+2 or PC=i+3. The destination control fields (DEC.—.-.SE and DEC.—.-.WA) are unlikely to be required until the last cycle of the latency period, and may be issued in cycle PC=i+4.

It is known that such measures are desirable in theory, but in practice cause complications for the previously known exception handling mechanisms. This is because there is no longer a clear answer to the question: 'did this operation complete before or after the exception?' This complication is mentioned for example by Rau et al in 'The CYDRA-5 Departmental Supercomputer', COMPUTER January 1990. See particularly the section starting on page 25, and continuing on page 26 to say 'Clearly, handling an exception. . .'. These considerations can therefore prevent the designer from eliminating control pipelining and thereby reducing the circuit size.

In contrast, the guarding mechanism of the device described herein allows a clear answer to this question, thereby allowing the designer to eliminate control pipelining. When an exception occurs each pending operation must be considered completed if and only if the guard selection field for that operation was issued before the exception was detected and the guard forcing signal GF became active. The time at which the other fields are issued is then a matter for the designer of the device and its scheduling compiler to determine, with freedom to eliminate control pipelining.

Since the timing of the issue of the guard selection field will then differ in relation to the detailed implementation of each different type of operation, the designer of the processing device must take care that the switching between replay and recording mode is timed appropriately for each functional unit.

Those skilled in the art will appreciate how the record/replay mechanism circuit described, the above and other variations on it, can be used for exception recovery in a wide range of data processing systems other than the VLIW processing device described herein.

We claim:

1. A method of operating a data processing system controlled by a sequence of instructions forming a program, the method comprising the steps of:

(a) defining a number of checkpoints in he program and executing the program, said execution involving data transfers within the system, including a first type of data transfer which is dependent on a defined machine state;

(b) interrupting execution of the program in response to an exception arising in the execution in step (a) and (c) re-executing the program from the most recent checkpoint after resolution of the exception; wherein step (a) includes recording event data relating to each data transfer of the first type since the most recent checkpoint, and step (c) includes reproducing the recorded event data in place of actual data transfers, synchronously with the re-execution, wherein the processing system includes a plurality of functional units controlled by respective fields of each instruction to perform respective operations in parallel, at least some of the functional units being provided with respective guard signals for conditionally preventing their operations having an effect on the defined machine state in spite of the issue of appropriate instructions, and wherein operations not completed before detection of the exception are inhibited by unconditionally forcing their guard signals in response to the detection of the exception.

2. A method as claimed in claim 1 wherein step (c) includes resuming normal execution of the program while recording event data relating to data transfers of the first type in accordance with step (a) when the re-execution reaches the point where the execution was interrupted in step (b).

3. A method as claimed in claim 1 wherein the interruption of execution in step (b) results in a transfer of control of the system from the program to an exception handling routine, and wherein the transfer of control is delayed so that instructions issued before the exception are allowed to complete their execution.

4. A method as claimed in claim 3 wherein operations started in the delay before the transfer of control to the exception handling routine are inhibited from having any effect on the defined machine state.

5. A method as claimed in claim 1 wherein the defined machine state includes the contents of a data memory of the system, while the first type of data transfer comprises reading a value from a location in the data memory and transferring it to a processing element of the system.

6. A method as claimed in claim 1 wherein the defined machine state is a subset of a total machine state of the processing system, and wherein the checkpoints are defined at points in the program where only the defined machine state is relevant to subsequent instructions in the program.

7. A method of operating a data processing system controlled by a sequence of instructions forming a program the method comprising the steps of:

(a) defining a number of checkpoints in the program and executing the program. said execution involving data transfers within the system. including a first type of data transfer which is dependent on a defined machine state;

(b) interrupting execution of the program in response to an exception arising in the execution in step (a) and (c) re-executing the program from the most recent checkpoint after resolution of the exception:

wherein step (a) includes recording event data relating to each data transfer of the first type since the most recent checkpoint, and step (c) includes reproducing the recorded event data in place of actual data transfers, synchronously with the re-execution, wherein to perform a give n operation the processing system is controlled by fields of more than one instruction, thereby to reduce control pipelining, the system being provided with at least one guard signal for conditionally preventing the given operation having an effect on the defined machine state, the fields including a guard selection field for selecting the guard signal for the given operation from a plurality of available guard signals, and wherein an operation is defined as occurring before or after the interruption caused by an exception depending on whether or not the guard selection field, as opposed to any other of the fields, was issued before the interruption.

8. A method as claimed in claim 7 wherein the processing device includes a plurality of functional units controlled by respective fields of each instruction to perform respective operations in parallel.

9. A data processing system comprising:

means for issuing a sequence of instructions forming a program for execution by the system;

means for identifying checkpoints in the program;

a first data path for effecting data transfers of a first type in the course of executing the program, each such data transfer being dependent on a defined machine state of the system;

means for causing interruption of the program execution in response to an exception; and means for causing re-execution of the program from the most recent checkpoint after resolution of the exception;

wherein the system further includes:

means connected to the data path for recording each data transfer of the first type since the most recent checkpoint, means active during the re-execution for breaking the data path and reproducing the recorded data transfers in place of actual data transfers, synchronously with the re-execution;

a plurality of functional units wherein at least some of the functional units are provided with respective guard signals for conditionally preventing their operations from having an effect on the defined machine state in spite of the issue of appropriate instructions; and means for inhibiting operations not completed before detection of the exception by unconditionally forcing their guard signals in response to the detection of the exception.

10. A system as claimed in claim 9 further including:

means for restoring the data path and reactivating the recording means when the re-execution reaches the point where the execution was previously interrupted.

11. A system as claimed in claim 9 further including:

means responsive to the exception for causing a transfer of control of the system from the program to an exception handling routine, the transfer of control being delayed so that operations started before the exception are allowed to complete their execution.

12. A system as claimed in claim 11 further including:

means for inhibiting operations started in the delay before the transfer of control to the exception handling routine so that such operations have no effect on the defined machine state.

13. A system as claimed in claim 9 wherein the defined machine state includes the contents of a data memory of the system, and wherein the data path connects a read port of the data memory to a processing element of the system.

14. A system as claimed in claim 13 wherein the data memory comprises a virtual memory system.

15. A system as claimed in claim 13 wherein during the re-execution of instructions read and write operations to the data memory are suppressed.

16. A system as claimed in claim 9 wherein the defined machine state is a subset of a total machine state of the processing system.

17. A system as claimed in claim 9 wherein the plurality of functional units are controlled by respective fields of each instruction to perform respective operations in parallel.

18. A data processing system comprising:

means for issuing a sequence of instructions forming a program for execution by the system;

means for identifying checkpoints In the program;

a first data path for effecting data transfers of a first type in the course of executing the program, each such data transfer being dependent on a defined machine state of the system;

means for causing interruption of the program execution in response to an exception; and means for causing re-execution of the program from the most recent checkpoint after resolution of the exception;

wherein the system further includes:

means connected to the data oath for recording each data transfer of the first type since the most recent checkpoint; and means active during the re-execution for breaking the data oath and reproducing the recorded data transfers in place of actual data transfers, synchronously with the re-execution, wherein to perform a given operation the processing system is controlled by fields of more than one instruction, thereby to reduce control pipelining, the system being provided with at least one guard signal for conditionally preventing the given operation having an effect on -he defined machine state, the fields including a guard selection field for selecting for the given operation a guard signal from a plurality of available guard signals, and wherein an operation -s defined as occurring before the interruption caused by an exception by reference to whether or not the guard selection field, as opposed to any other of the fields, was issued before the interruption.

19. A data processing device comprising:

memory means for storage of data;

processing means for processing data;

a data path for effecting data transfers from the memory means to the processing means; and sequencing means for controlling operation of the memory means and processing means in accordance with a sequence of instructions forming a program;

characterized by:

record/replay means connected to the data path for (i) in a recording mode recording data transferred and (ii) in a replay mode breaking the data path while supplying to the processing data recorded previously in the recording mode wherein the processing device includes a plurality of functional units controlled by respective fields of each instruction to perform respective operations in parallel, at least some of the functional units being provided with respective guard signals for conditionally preventing their operations having an effect on the defined machine state in spite of the issue of appropriate instructions, and wherein operations not completed before detection of the exception are inhibited by unconditionally forcing their guard signals in response to the detection of the exception.

20. A processing device as claimed in claim 20 wherein the record/replay means comprises:

a multiplexer connected in the data path by having a first input connected to the memory means and an output connected to the processing means;

an event memory circuit having a data input connected to the data path, a data output connected to a second input of the multiplexer, and an address input;

a control circuit for (i) in a recording mode causing the multiplexer to connect the memory means to the processing means and causing the event memory to store each value transferred from the memory means to the processing means, and (ii) in a replay mode causing the multiplexer to connect the data output of the event memory to the processing means and causing the event memory to reproduce the values stored previously in recording mode.

21. A data processing device as claimed in claim 19 wherein the memory means comprises a virtual memory system.

22. A data processing device as claimed in claim 19 wherein the processing means comprises a plurality of functional units constructed to operate synchronously with one another under control of respective fields of the program instructions.

23. A data processing device as claimed in claim 19 wherein the memory means comprises a virtual memory system.

* * * * *